Oct. 31, 1967 P. SURY 3,349,443
FASTENER CLIP FOR MOUNTING PICTURES AND THE LIKE
Filed April 18, 1966

INVENTOR.
PETER SURY
BY Lynn H Latta

United States Patent Office 3,349,443
Patented Oct. 31, 1967

3,349,443
FASTENER CLIP FOR MOUNTING PICTURES AND THE LIKE
Peter Sury, 1910 Holmby Ave., Los Angeles, Calif. 90025
Filed Apr. 18, 1966, Ser. No. 543,126
1 Claim. (Cl. 24—73)

ABSTRACT OF THE DISCLOSURE

Disclosed herein is a fastener of stamped resilient sheet metal clip for securing a penetrable backing panel to a glass plate covering a picture or the like, comprising, at one end a piercing point for embedment in the backing panel to hold the clip in position with a hook on its opposite end hooked over the margin of the glass plate, and with a pair of integral spring fingers pressing the sandwich of backing panel, picture and glass plate forwardly against the hook.

---

Figure 1:
Figure 5:
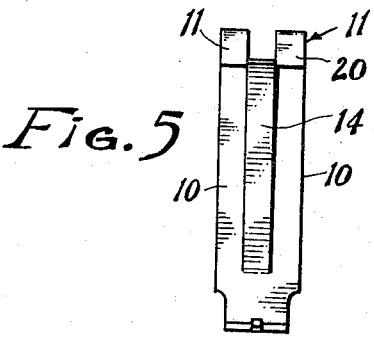
Figure 3:
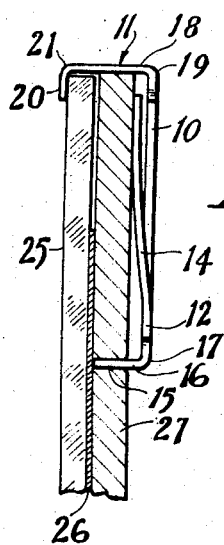
Figure 4:
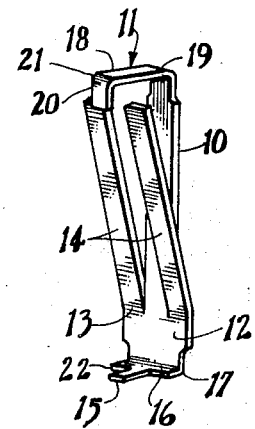
Figure 2:
Figure 6:
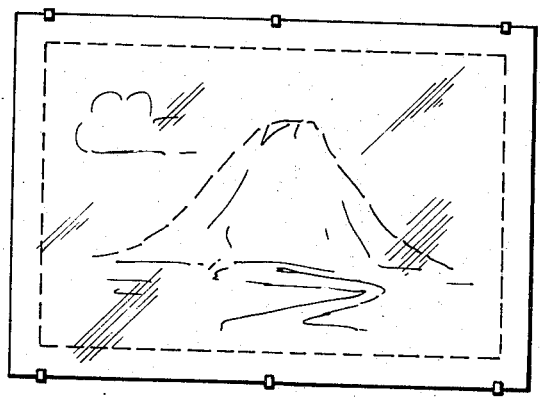

This invention relates to a fastener and more particularly to a fastener-clip for securing a pentrable backing panel to a hard, impenetrable facing plate such as the glass covering of a picture. The general object of the invention is to provide a spring clip having means for anchoring it to a penetrable back panel and for clamping an impenetrable facing plate against such back panel with or without an interposed thin sheet such as a photographic print, picture or the like. More specifically the invention aims to provide such a fastener clip:

(1) Of simple, inexpensive, one-piece construction;
(2) Having integral means for spring-loading the facing and backing panels into flat face-to-face engagement with an interposed sheet;
(3) Having at one end an integral holding hook adapted to engage the backing panel;
(4) Having at its opposite end an integral prong adapted to be driven into and to penetrate the backing panel in a manner to secure the clip with the holding finger in holding relation to the facing panel;
(5) Other objects will become apparent in the ensuing specification and appended drawings in which:

FIG. 1 is a side elevation of a fastener embodying one form of the invention;
FIG. 2 is a front elevational view of the same;
FIG. 3 is a side view of a glass facing panel secured to a wood backing panel by a fastener embodying the invention;
FIG. 4 is a perspective view of the embodiment of the invention shown in FIGS. 1–3;
FIG. 5 is a front-elevational view of a second embodiment of the invention having two holding hooks separated by an integral spring-loading finger; and
FIG. 6 is a view of a picture sandwich comprising an assembly of panels secured by fasteners embodying the invention.

Referring now to the drawing in detail and in particular to FIGS. 1–4, I have shown therein, as an example of one form in which the invention may be embodied, a fastener clip stamped from spring sheet metal and comprising a bridge bar 10 having at one end an integral holding hook 11 and integrally joined at its other end to a body web 12 having, on opposite sides of the bridge bar 10, shoulders 13 to which are integrally joined a pair of spring-loading fingers 14. An anchor prong 15 is formed integrally with a toe member 16 which is integrally joined to the end of body web 12 by a right-dihedral angular bend 17. The holding hook 11 comprises a finger 18 joined to the end of web 10 by a right-angular bend 19, and a claw 20 which is joined to the forward end of finger 18 by a right-angular bend 21. The shoulders 13 consist of obtuse-angular bends joining the spring fingers 14 to the shoulder portions of body web 12.

The hook 11 and prong 15 both project forwardly from respective ends of the fastener clip, the hook 11 projecting beyond the prong 15 a distance at least equal to the combined thickness of a facing plate 25 and a thin picture sheet or the like 26 sandwiched between the facing plate 25 and a penetrable backing panel 27 (FIG. 3). The prong 15 is no longer than the thickness of the backing panel 27 in which it is to be anchored. The toe 16 projects forwardly from the body web 12 a distance corresponding approximately to a space that will exist between the back surface of backing panel 27 and the bridge bar 10, the forward extremity of toe 16 defining, on respective sides of prong 15, a pair of abutment shoulders 22 for engagement against the backing panel 27.

In the unstressed condition of spring-loading fingers 14, in the clip when not in use, the fingers 14 are inclined forwardly from the plane of body web 12 to an extent such that the tips of fingers 14 will lie just behind the claw 20 of hook 11. In the assembly of the clip and a panel sandwich, as in FIG. 3, the loading fingers 14 are flexed back to a position near the plane of bridge bar 10, and their free ends exert pressure forwardly against the backing panel 27 while the claw 20, engaging the front of facing panel 25, exerts reaction pressure rearwardly against the same, whereby the sheet 26 is firmly clamped between the panels 25 and 27. The prong 15, impaled in the backing panel 27, holds the finger 18 of holding hook 11 in engagement with or close to the margins of the panels 25 and 27, preventing the claw 20 from slipping off the margin of facing panel 25, and thus securing the clip and the sandwich in assembly.

A sandwiched picture assembly such as is illustrated in FIGS. 3 and 6 may comprise a soft, thin picture sheet 26, a facing panel 25 of glass or transparent rigid plastic material, and a backing panel 27 of heavy chip board, plywood or the like. Such an assembly can be quickly and easily made by superimposing a picture sheet 26 upon a backing panel 27 with the respective margins in a symmetrical or other desirable positional relationship, and by then superimposing the glass facing panel 25 upon the picture sheet 26 with its margins substantially registering with those of the backing panel 27. While holding such sandwich assembly in a manner to prevent displacement of the parts thereof, it can then be arranged with the facing glass 25 at the bottom of the sandwich and resting upon a suitable flat supporting surface. A plurality of the clips are then installed as follows: A clip is grasped and a hook 11 is fitted over the registering margins of the panels 25 and 27, with its claw 20 inserted between the facing glass 25 and the supporting surface. The hook 11 is moved into engagement with the margin of one or both of the panels 25 or 27 while the tip of prong 15 rests in contact with the back surface of backing panel 27. While holding the hook 11 snugly against the periphery of the sandwich, the body web 12 is tapped with a hammer or the like so as to drive the prong 15 into the backing panel 27, until the abutment shoulders 22 engage the panel 27. This process is repeated until a sufficient number of the fastener clips have been attached in selected locations (e.g. as shown in FIG. 6). The sandwich is then secured, and by attaching a suitable hanger element or elements to the backing panel 27, the sandwiched picture can be hung upon a wall.

FIG. 5 illustrates a modified form of the invention wherein there are two of the holding hooks 11 on the ends of respective laterally spaced bridge bars 10, and wherein there is a single spring loading finger 14 disposed between the bridge bars 10. The installation of the clip of FIG. 5 is the same as that of FIGS. 1–4.

It may now be noted that the invention provides a unitary mounting clip having the holding hook 11 and anchor prong 15 integrally formed at respective ends of a bridge bar or bars thereof, and having the spring fingers (or finger) 14 struck from a strip of spring sheet material by a suitable shearing and bending operation, the combined widths of the spring fingers or finger and the bridge bar or bridge bars being equal to the width of the body web 12. Thus the clip is formed in a series of blanking and forming operations from a strip or ribbon of spring sheet material.

I claim:

A fastener comprising at one end thereof a body web and a prong joined thereto by an integral right dihedral-angular bend;
- a bridge bar extending from said web in the plane thereof to the opposite end of the fastener;
- a holding hook at said opposite end, and extending integrally from the end of said bridge bar in the same direction as said prong and terminating in a claw adapted to engage the forward side of a sandwich of panels while said bridge bar is disposed in adjacent, parallel relation to the rear side thereof;
- a pair of spring loading fingers struck from respective sides of said bridge bar and inclined forwardly toward said claw, adapted to engage the back side of said sandwich; said prong being adapted to be embedded in the back panel of said sandwich so as to anchor said clip to the sandwich with said holding hook retained in holding engagement with the sandwich at its margin;
- said pair of spring loading fingers being arranged at respective sides of said bridge bar in a first common plane, and said body web and bridge bar being disposed in a second plane subtending an acute dihedral angle to said first common plane;
- each side edge of said bridge bar and the adjacent inner edge of an adjacent finger being disposed in a common plane, said last mentioned common planes being parallel with each other and normal to the plane of said body web; and
- a transversely extending toe projecting forwardly from the end of said body web at right angles thereto, said prong being an integral extension of said toe, projecting forwardly from the center thereof, and said toe terminating in forwardly facing abutment shoulders on respective sides of said prong, for positioning engagement with said back panel.

References Cited

UNITED STATES PATENTS 2,885,166   5/1959   Lehni et al. _____ 248—490

FOREIGN PATENTS 635,806   4/1950   Great Britain.
319,507   2/1957   Switzerland.

OTHELL M. SIMPSON, *Primary Examiner.*

WILLIAM FELDMAN, *Examiner.*

G. WEIDENFELD, *Assistant Examiner.*